US006120283A

United States Patent [19]

Cousins

[11] Patent Number: 6,120,283

[45] Date of Patent: Sep. 19, 2000

[54] MODULAR CANDLE HOLDER

[75] Inventor: Morison S. Cousins, Winter Park, Fla.

[73] Assignee: Dart Industries Inc., Orlando, Fla.

[21] Appl. No.: 09/418,434

[22] Filed: Oct. 14, 1999

[51] Int. Cl.[7] .................... F16M 11/00

[52] U.S. Cl. .................... 431/289; D26/22; 248/511

[58] Field of Search .................... 431/126, 289, 431/291, 294, 295, 297; 248/511, 519, 529; D26/9, 13, 22

[56] References Cited

U.S. PATENT DOCUMENTS

| | | | |
|---|---|---|---|
| D. 248,075 | 6/1978 | Daenen | D7/11 |
| D. 262,932 | 2/1982 | Daenen | D7/40 |
| D. 348,589 | 7/1994 | Cautereels | D7/558 |
| 2,057,943 | 10/1936 | Friedrichs | 67/23 |
| 2,111,642 | 3/1938 | Saier | 67/23 |
| 2,621,503 | 12/1952 | Schaefer | 67/23 |
| 3,743,473 | 7/1973 | Von Suskill | 431/297 |
| 3,932,113 | 1/1976 | Thrush | 431/297 |
| 4,036,577 | 7/1977 | Veitel | 431/35 |
| 4,937,701 | 6/1990 | Schroder | 362/161 |
| 5,651,669 | 7/1997 | Henry | 431/297 |

*Primary Examiner*—Ira S. Lazarus
*Assistant Examiner*—Sara Clarke
*Attorney, Agent, or Firm*—Taylor J. Ross

[57] ABSTRACT

A modular candle holder having first and second components. Each of the two components includes first and second longitudinal ends, with each end having at least one candle-receiving cavity therein. These cavities are preferably of different diameters to accept different candle sizes. While the component rests upon one of these ends, the other end may receive a candle. The outer walls of the two component types are distinctively different, such as generally cylindrical compared to stepped diameters, to provide different aesthetic impressions. The longitudinal ends of each component also mate with the other component, or with like components. As such, one or more of each component type may be assembled together in various stacked configurations to form a candle holder having numerous different appearance.

3 Claims, 1 Drawing Sheet

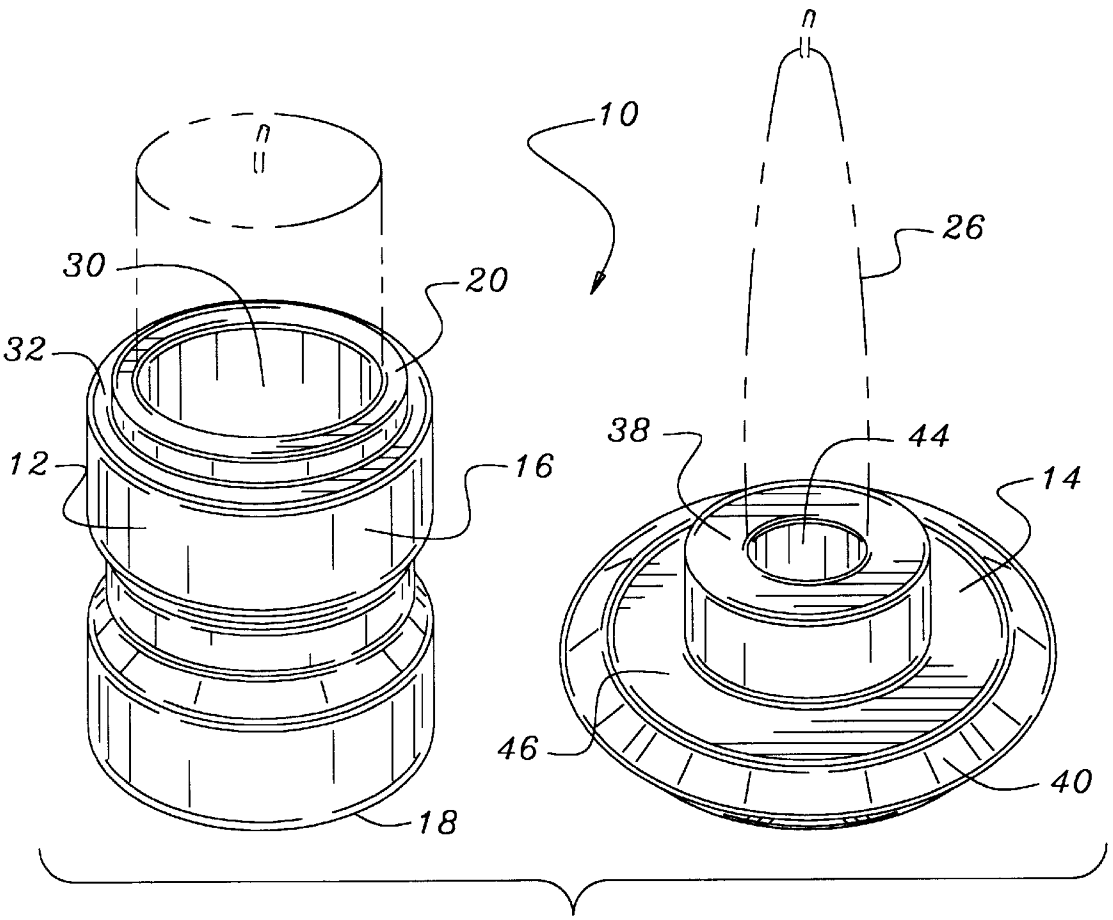
FIG. 1
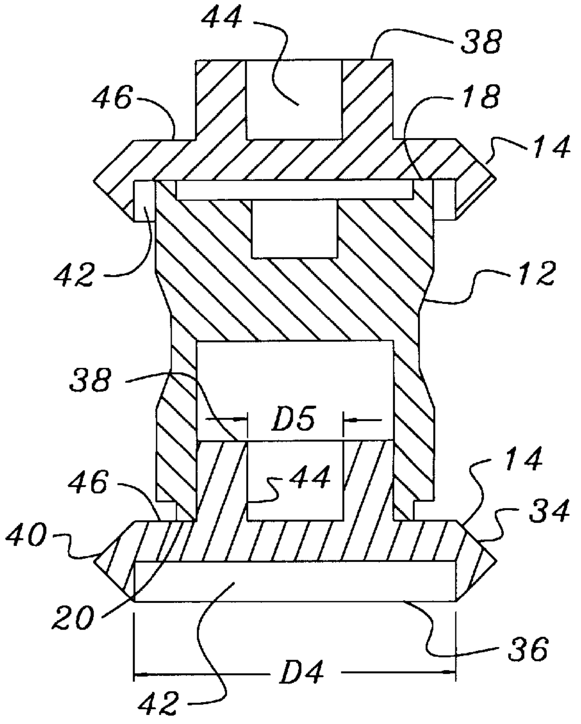
FIG. 3
FIG. 2
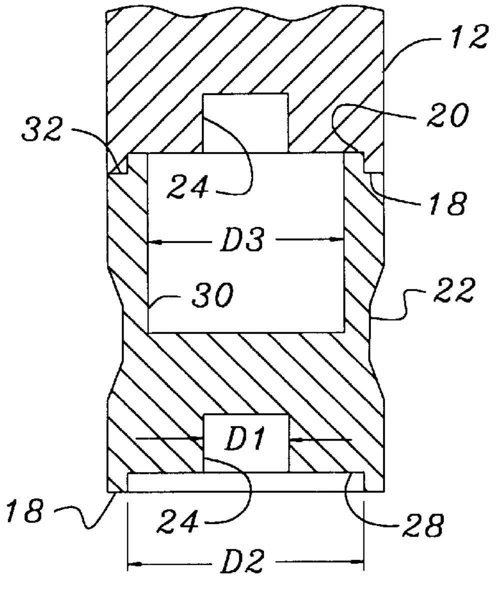

MODULAR CANDLE HOLDER

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to candle holders. In particular, the present invention relates to an improved candle holder having two modular pieces which may be arranged in various combination to hold a candle.

Various candle holders are known in the prior art, and generally consist of a body having at its upper end a cavity to receive and support a candle. This cavity may be any of various diameters corresponding to standard candle sizes. A wide range of decorative motifs have been applied in candle holder design, providing a great diversity in aesthetic appearance.

While such prior art candle holders are acceptable, it is preferred that the holder have a greater range in utility by accepting candles having several different diameters. Further, it is preferred that the user have greater control over the aesthetics of the candle holder, and could easily chose among several variations in design. Yet further, it is preferred that the user be able to readily change this design to a different design, permitting greater variety.

SUMMARY OF THE INVENTION

These and other objects are achieved by a modular candle holder having first and second components. Each of the two components includes first and second longitudinal ends, with each end having at least one candle-receiving cavity therein. These cavities are preferably of different diameters to accept different candle sizes. While the component rests upon one of these ends, the other end may receive a candle. The outer walls of the two component types are distinctively different, such as generally cylindrical compared to stepped diameters, to provide different aesthetic impressions. The longitudinal ends of each component also mate with the other component, or with like components. As such, one or more of each component type may be assembled together in various stacked configurations to form a candle holder having numerous different appearances.

BRIEF DESCRIPTION OF THE DRAWINGS

The objects and features of the invention noted above are explained in more detail with reference to the drawings, in which like reference numerals denote like elements, and in which:

FIG. 1 is a perspective view of the two components of the present invention in a disassembled relationship;

FIG. 2 is a cross-sectional detail side view of two like components assembled together; and FIG. 3 is a cross-sectional side view of three of the components assembled together.

DETAILED DESCRIPTION OF THE INVENTION

With reference to FIG. 1, a candle holder according to the present invention is generally designated by reference numeral 10. The candle holder 10 is formed of one or more first components 12 assembled together with one or more second components 14. Each will be described individually before discussing their assembly.

The first components 12 have a generally cylindrical main body 16 having, along its longitudinal axis, a first end 18 and a second end 20, with a first component side wall 22 extending therebetween. The first components 12 may be formed of a variety of materials or combinations of materials, although glass is preferred.

Each of these longitudinal ends include at least one candle-receiving cavity opening longitudinally outward. The first end 18 includes a first cavity 24 having an effective diameter D1. By effective diameter, it is meant that a candle having a diameter very similar to D1 would be received therein in a supporting relationship, regardless of the internal configuration of the cavity, which could be cylindrical as shown, or could include a faceted interior. In the embodiment shown, the first cavity 24 will accept standard taper candles 26 such as illustrated in FIG. 1.

The first end 18 also includes a second cavity 28 having an effective diameter D2, which is larger than D1. As such, the first cavity 24 actually opens onto the second cavity 28. The second end 20 of first components 12 includes a third cavity 30 having an effective diameter D3 preferably (but not necessarily) of a size to receive a votive candle therein. This diameter D3 is less than that of the diameter D2. The second end 20 preferably also includes an outer shoulder 32 formed therein, such that a projection is formed having a size and shape which will mate with the second cavity 28. In the embodiment shown, this is cylindrical, and this mating relationship is illustrated in FIG. 2. As may be seen, two of the first components 12 may be stacked upon each other with the second cavity 28 of the upper first component 12 partially receiving the second end 20 of the lower first component 12. This provides a relatively stable arrangement, with the upper one of the first components 12 presenting the first end 18 for receiving a candle. Of course, this entire stack could be inverted, such that a second end 20 is presented for receiving a candle.

The second components 14 have a different configuration. Each of the second components 14 has a main body 34 having generally stepped configuration, with longitudinally opposed first and second ends 36 and 38, respectively, with a second component side wall 40 extending therebetween. As with the first components 12, the first end 36 of second components 14 includes a first cavity 42 having an effective diameter D4, such as might receive a pillar candle. Similarly, the second end 38 includes a second cavity 44 having an effective diameter D5.

The stepped configuration of the second components 14 is similar to the form of the second end 20 of first components 12. In particular, a shoulder 46 is formed in the second component side wall 40 adjacent the second end 38, resulting in the second component side wall 40 adjacent this second end 38 having an effective diameter of slightly less than D3. As illustrated in FIG. 3, this will permit the third cavity 30 of first component 12 to receive the second end 38 of second component 14 therein, with the first end 18 resting upon shoulder 46. As such, the first components 12 may stack upon the second components 14 as shown in FIG. 3 (and of course an inverted relationship is also possible) in a stable manner.

As a further refinement, it is preferred that the first component side wall 22 adjacent second end 20 have a size and shape such that it may be received within first cavity 42 of second component 14. As shown in the preferred embodiment, this need not be a close fit, but alternatively could be designed as such by increasing the size of the first components 12 adjacent second end 20. With this arrangement, a second component 14 may be stacked upon a first components 12 with first end 18 and first end 36, respectively, being adjacent. As with the other stacking arrangements, the inverse is of course also possible.

Finally, the second components 14 may be stacked together without intervening first components 12. While not shown, it is easily envisioned that the second end 38 of one second component 14 may be received within the first cavity 42 of another second component 14, again with either the first end 36 or second end 38 presented uppermost.

As may be seen, the present arrangement of two components, each having at least one cavity in each end, and stackable, provides numerous possible combinations each having differing aesthetic appearances. The ease of stacking further enhances the utility of the present arrangement, permitting changes to be made on a frequent basis with little trouble.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A modular candle holder, comprising:

at least one first component having a main body and longitudinally opposed first and second ends, a second cavity, having a second effective diameter, opening on said first end, a third cavity, having a third effective diameter, opening on said second end, and a peripheral shoulder opening on said second end, said shoulder forming a projection having a size and shape to permit mating with said second cavity; and at least one second component having a main body and longitudinally opposed first and second ends, a fourth cavity, having a fourth effective diameter, opening on said first end of said second component, a fifth cavity, having a fifth effective diameter, opening on said second end of said second component, and a peripheral shoulder opening on said second end of said second component, said shoulder forming a projection having a size and shape to permit mating with said third cavity of said first component, whereby said first and second components may be stacked vertically in various combinations with said mating of said projections and cavities.

2. A modular candle holder as in claim 1, wherein said first end of said first component is sized and shaped to permit receipt within said fourth cavity, and said second end of said second component is sized and shaped to permit receipt within said fourth cavity.

3. A modular candle holder as in claim 2, further comprising a first cavity opening onto said second cavity.

* * * * *